(12) United States Patent
Hamparsomian

(10) Patent No.: US 10,694,853 B2
(45) Date of Patent: Jun. 30, 2020

(54) PORTABLE SUPPORT DEVICE AND METHOD OF USING THE SAME

(71) Applicant: Sako Hamparsomian, Altadena, CA (US)

(72) Inventor: Sako Hamparsomian, Altadena, CA (US)

(*) Notice: Subject to any disclaimer, the term of this patent is extended or adjusted under 35 U.S.C. 154(b) by 0 days.

(21) Appl. No.: 16/108,651

(22) Filed: Aug. 22, 2018

(65) Prior Publication Data

US 2020/0060425 A1 Feb. 27, 2020

(51) Int. Cl.
*B60N 2/02* (2006.01)
*A47C 7/38* (2006.01)
*B60N 2/882* (2018.01)
*A47G 9/10* (2006.01)

(52) U.S. Cl.
CPC ............ *A47C 7/383* (2013.01); *A47G 9/1081* (2013.01); *B60N 2/882* (2018.02)

(58) Field of Classification Search
CPC ..... B60N 2/882; B60N 2/2872; B60N 2/2881
USPC ..... 297/397, 391, 394, 219.12, 230.13, 464, 297/230.1, 230.14; 5/640, 636, 644, 655
See application file for complete search history.

(56) References Cited

U.S. PATENT DOCUMENTS

| | | | |
|---|---|---|---|
| 3,608,964 A | 9/1971 | Earl | |
| 4,904,021 A | 2/1990 | Clemmer | |
| 5,064,245 A * | 11/1991 | Stephens | A47C 7/383 297/391 |
| 5,332,292 A * | 7/1994 | Price | B60N 2/2839 297/219.12 |
| 5,544,378 A * | 8/1996 | Chow | A47C 7/383 297/397 |
| 5,975,638 A | 11/1999 | Scheiner | |
| 6,279,185 B1 | 8/2001 | Matthews | |
| 6,305,749 B1 * | 10/2001 | O'Connor | A47C 7/383 297/397 |
| 6,793,287 B2 * | 9/2004 | Dunk | B60N 2/2872 297/219.12 |

(Continued)

*Primary Examiner* — Chi Q Nguyen
(74) *Attorney, Agent, or Firm* — Eandi Fitzpatrick LLP; William Fitzpatrick

(57) ABSTRACT

A support device configured to overlay a seating assembly and configured to support the torso, neck, and head of a user is provided. The support device has a first elongated bolster cushion configured to support a first thoracic side of the user, a second elongated bolster cushion configured to support a second thoracic side of the user, a first adjustable strap coupled to a upper portion of the first elongated bolster cushion and an upper portion of the second elongated bolster cushion such that the strap connects each of the first and second elongated bolster cushions on their respective lower portions, a second adjustable strap coupled to a lower portion of the first elongated bolster cushion and a lower portion of the second elongated bolster cushion such that the strap connects each of the first and second elongated bolster cushions on their respective lower portions, wherein when the first adjustable strap is tightened the upper portions of the first and second elongated bolsters move towards each other such that the first and second elongated bolsters for a tapered shape with respect to the other to support the user's thoracic sides, neck, head of the user or any combination thereof.

8 Claims, 6 Drawing Sheets

(56) References Cited

U.S. PATENT DOCUMENTS

| | | | | |
|---|---|---|---|---|
| 6,820,938 B2* | 11/2004 | Barrett | .................... | A47C 7/029 |
| | | | | 297/452.41 |
| 8,763,177 B2* | 7/2014 | Shah | .................... | A61G 13/121 |
| | | | | 128/846 |
| 9,193,285 B1* | 11/2015 | Jordan | .................... | A47C 7/546 |
| 2006/0244297 A1 | 11/2006 | Demski | | |
| 2009/0206646 A1 | 8/2009 | Mittelstadt | | |
| 2012/0313417 A1* | 12/2012 | Hurwitz | ................. | B60N 2/882 |
| | | | | 297/391 |
| 2014/0000036 A1* | 1/2014 | Cohen | .................... | A47C 7/383 |
| | | | | 5/639 |
| 2015/0150391 A1* | 6/2015 | Hsu | ......................... | A47G 9/10 |
| | | | | 5/636 |
| 2016/0183685 A1* | 6/2016 | Kang | .................... | A47C 7/383 |
| | | | | 5/639 |
| 2017/0000273 A1* | 1/2017 | Mitchell | ................ | A47C 7/383 |

* cited by examiner

PORTABLE SUPPORT DEVICE AND METHOD OF USING THE SAME

CROSS-REFERENCE TO RELATED APPLICATIONS

Not Applicable.

FIELD OF THE INVENTION

The present invention relates generally to the field of support devices. More particularly, the present invention relates to a certain new and useful support pillow that provides a portable support for a seated individual's neck and shoulders, wherein the support pillow functions as a sleep and rest device; reference being had to the drawings accompanying and forming a part of the same.

BACKGROUND

Portable travel and support pillows have been in existence for some time and have been used in a variety of applications. Some of these devices are specifically crafted to attach the provided support to a user's head, whether it is by attaching the device to another stationary object such as a car seat or fitting the device over one's head to provide a snug and close support. However, many times, these devices are only made with universal fitment in mind and do not consider the different levels of desired comfort a particular individual may have. In addition, many of these devices are only concerned with providing support for a user's heads, and do not take into consideration the close extremities that are oftentimes victims of improper sleeping, such as one's neck and shoulders.

An example of a support device is shown in U.S. Patent No. 2009/0206646 A1, published Aug. 20, 2009, which describes a portable support including a pillow that is particularly for positioning against the head of a person when traveling on an airplane, train, bus, or automobile. Another example of a support device is shown in U.S. Pat. No. 6,279,185 B1, published Aug. 28, 2001, which describes a support pillow that is suitable for placement around an object and that may be expanded when placed about an object and then returned to its original shape following removal from the object. Yet another example of a support device is shown in U.S. Pat. No. 3,608,964, published on Sep. 28, 1971, which describes a pillow unit for use with a seat back, particularly the back of a passenger seat in a vehicle.

Furthermore, car seats that are made for infants and children are notoriously uncomfortable. In turn, children are prone to letting their parents know they are uncomfortable, which leads to distracted driving. Many of the car seats today do not mold to the child's body properly, and thus do not provide the request level of support. This can lead to the aforementioned discomfort.

An example of such a car seat is shown in U.S. Pat. No. 4,936,629, published Jun. 26, 1990, which describes an infant car seat that is reclinable and rotatable and adapted to mount atop a standard automobile seat. Another example of such a car seat is shown in U.S. Pat. No. 3,563,600, published Feb. 16, 1971, which describes an infant car seat of the safety padded type that is anchored to the automobile seat by use of the conventional automobile safety belts. Yet another example of such a car seat is shown in U.S. Pat. No. 6,908,151 B2, published on Jun. 21, 2005, which describes a juvenile booster car seat that folds compactly for easy transportation.

As such, a need exists for a new and improved support pillow, one that allows individuals to customize the type of pillow used within the support device to allow for a more customized feel, and that also provides support for an individual's neck and shoulders to prevent against unwarranted neck pains and potential injuries.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

To achieve the foregoing and other aspects and in accordance with the purpose of the invention, a portable head, neck, and shoulder support pillow is provided.

Accordingly, it is an object of the present invention to provide a new and improved support pillow that serves multiple purposes and is convenient and easy to use.

The support device decreases the likelihood of injuries occurring while sleeping in a vehicle.

Another object of the present invention is to provide a new and improved support pillow that decreases the likelihood of having neck and shoulder pain while sleeping in a vehicle.

In addition, rather than utilizing the same pillow structure and density in each support device, the new and improved support device provides users the ability to change the pillow utilized in the support device to allow for customization to individual user preferences. Designing the device in such a manner is important as it will allow users the ability to customize the support pillow for maximum comfort, as many times the issue with support pillows are found with their universal fitment approach that does not take into consideration the dynamic variables associated with sleeping and comfort that vary between users.

The support device is easy to use and inexpensive to construct.

In exemplary embodiments, a support device configured to overlay a seating assembly and configured to support the torso, neck, and head of a user is provided. The device comprises a first elongated bolster cushion configured to support a first thoracic side of the user; a second elongated bolster cushion configured to support a second thoracic side of the user; a first adjustable strap coupled to a upper portion 126 of the first elongated bolster cushion and an upper portion of the second elongated bolster cushion such that the strap connects each of the first and second elongated bolster cushions on their respective lower portions; a second adjustable strap coupled to a lower portion 130 of the first elongated bolster cushion and a lower portion of the second elongated bolster cushion such that the strap connects each of the first and second elongated bolster cushions on their respective lower portions, wherein when the first adjustable strap is tightened the upper portions of the first and second elongated bolsters move towards each other such that the first and second elongated bolsters for a tapered shape with respect to the other to support the user's thoracic sides, neck and head of the user.

In an exemplary embodiment, a method for supporting a user seated in a seating assembly is provided. The method comprises overlaying the support device on the seating assembly, the support device comprising a first elongated bolster cushion configured to support a first thoracic side of the user and a second elongated bolster cushion configured to support a second thoracic side of the user; coupling the support device to the seating assembly by placing a first adjustable strap around the seating assembly; adjusting the strap so it is taught against the seating assembly; seating a user in the seating assembly and support device coupled thereto; further coupling the support device to the seating assembly by placing a second lower adjustable strap around the seating assembly, adjusting each of the straps such that the user is supported on the first thoracic side the second thoracic side.

Other features, advantages, and aspects of the present invention will become more apparent and be more readily understood from the following detailed description, which should be read in conjunction with the accompanying drawings.

DETAILED DESCRIPTION OF THE INVENTION

Figure 1:
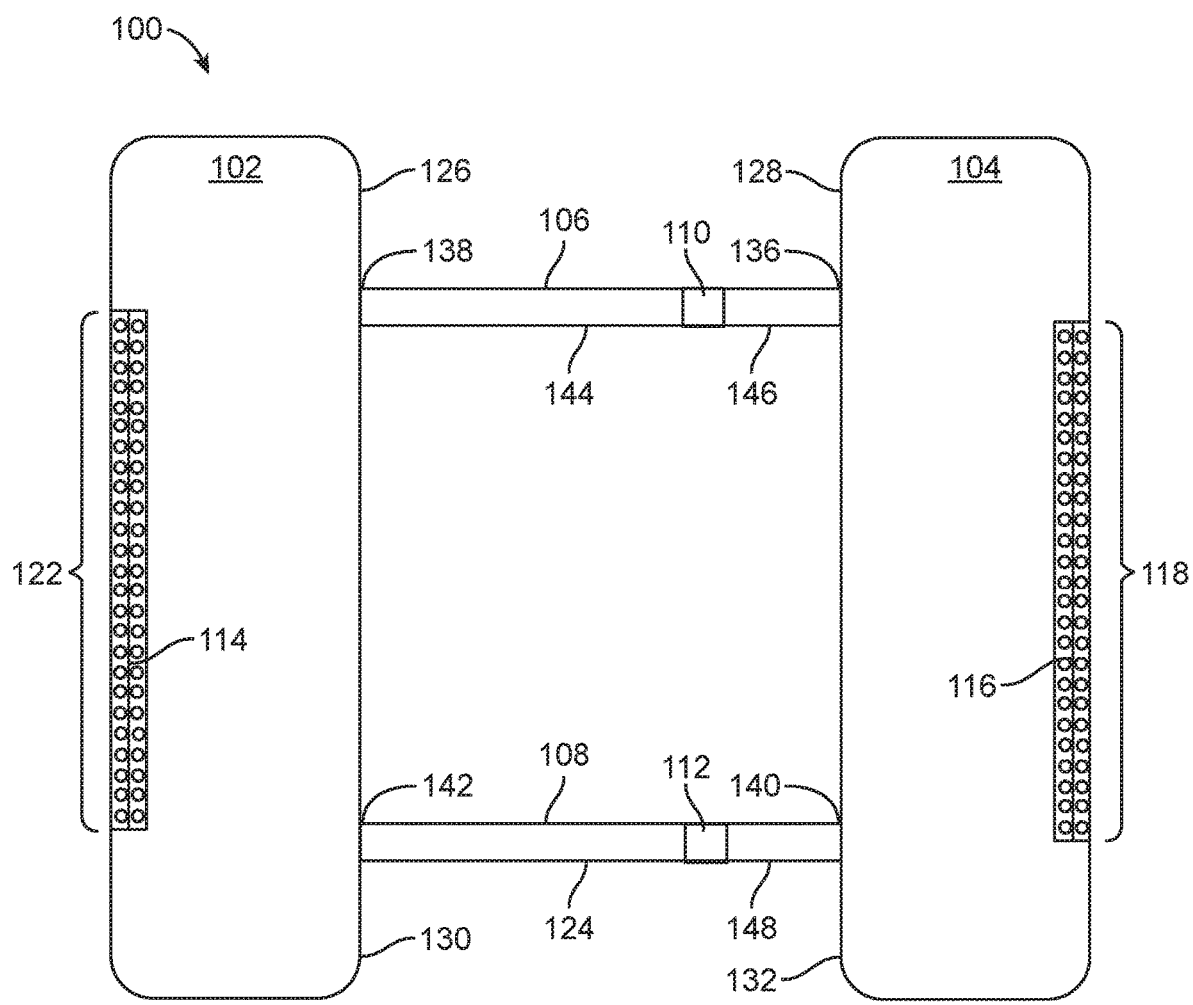
FIG. 1 is a perspective front view of a support device in accordance with one embodiment of the present invention.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described are shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

In one general aspect, the present invention is directed to computer-based systems and methods that utilize gamification to create a more immersive, efficient and effective therapy treatment for individuals required to use an incentive spirometer, with each therapy game being specifically tailored to account for an individual's health needs and its prior performance on each therapy game.

As used herein, the term "user" shall mean any individual of any age, which includes both children and adults.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be also understood to refer to functional equivalents of such structures. The present invention will now be described in detail with reference to embodiments thereof as illustrated in the accompanying drawings. While reference is made to tablets, the present invention is applicable to other mobile devices such as e-readers, phones, and the like.

Specific configurations and arrangements of the invention, discussed above regarding the accompanying drawing, are for illustrative purposes only. Other configurations and arrangements that are within the purview of a skilled artisan can be made, used, or sold without departing from the spirit and scope of the invention. For example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures.

Referring now to FIG. 1, a perspective view of a support device in accordance with one embodiment of the present invention, is presented generally at 100. The support device 100 comprise a first elongated bolster cushion 102 and a second elongated bolster cushion 104 (each also referred to as "bolster". The first elongated bolster 102 and the second elongated bolster 104 are each, in the current embodiment illustration, constructed of a flexible material made of cotton that is hypoallergenic. In optional embodiments, the first elongated bolster 102 and second elongated bolster 104 may be constructed of another material that is resilient, compression resistant, and hypoallergenic, such as polyester. Based on the inner material of the bolsters, they are configured to be pliable and malleable such that, in operation, they sit the user snugly. Furthermore, the bolsters 102 and 104 may have coverings over them made of cotton that is hypoallergenic as well.

Still referring to FIG. 1, the first elongated bolster 102 and second elongated bolster 104 each comprise a zipper 122 and 118, respectively, which allows the support device 100 to receive a pillow. Optionally, other fasteners may be used such as hook and loop fasteners, magnets, and the like. In the current embodiment, the pillow that will be received by the first elongated bolster 102 and the second elongated bolster 104 are constructed of hypoallergenic down alternative material. In optional embodiments, however, any suitable alternative material may be used, such as feather pillows, full down pillows, memory foam pillows, microbead pillows, buckwheat pillows or any other cushioning material that is suitable for the current application. The first elongated bolster 102 and second elongated bolsters 104 each comprise a hollow interior and a closeable pouches 114 and 116 respectively, that allow the user to change a material in the interior of each of the elongated bolsters 102 and 104. The first elongated bolster 102 and second elongated bolster 104 each has a curved configuration. Suitably, the overall height (length) of the first elongated bolster 102 and the second elongated bolster 104 is thirty inches (30") for each, while the width of the first elongated bolster 102 and the second elongated bolster 104 is six inches (6") for each. The length of the bolsters is designed to match the average length of an individual's torso.

Still referring to FIG. 1, a first adjustable strap 106 is coupled to the upper portion 126 of the first elongated bolster 102 at the connection point 138 as well as to the upper portion 128 of the second elongated bolster 104 at the connection point 136. The first adjustable strap 106 comprises a left strap 144 that is coupled to the upper portion 126 as well as a right strap 146 that is coupled to the upper portion 136. The left strap 144 is coupled to the right strap 146 to form one first adjustable strap 106 through the use of the buckle 110. In the current embodiment, the first adjustable strap 106 is coupled to the connection points 136, 138 through the use of stitching. In optional embodiments, the first adjustable strap 106 may be coupled to the connection points 136, 138 through the use of heat bonding or ultrasonic bonding.

Still referring to FIG. 1, the support device 100 comprises a second adjustable strap 108 that is coupled to the lower portion 130 of the first elongated bolster 102 at the connection point 142 and the lower portion 132 of the second elongated bolster 104 at the connection point 140. The second adjustable strap 108 comprises a left strap 124 that is coupled to the lower portion 130 as well as a right strap 148 that is coupled to the lower portion 132. The left strap 124 is coupled to the right strap 148 to form one second adjustable strap 108 through the use of the buckle 112. In the current embodiment, the second adjustable strap 108 is coupled to the connection points 140, 142 through the use of stitching. In optional embodiments, the second adjustable strap 108 may be coupled to the connection points 140,142 through the use of heat bonding or ultrasonic bonding. In the current embodiment, the first adjustable strap 106 and the second adjustable strap 108 are comprised of nylon. In optional embodiments, the first adjustable strap 106 and the second adjustable strap 108 may be comprised of any other suitable material such as a polyester. In optional embodiments, releasable fasteners may be used.

Still referring to FIG. 1, the first adjustable strap 106 and the second adjustable strap 108 each have a width of approximately one foot, while the left straps 144 and 124 each have a length of 40" each and the right straps 146 and 148 each have a length of approximately four feet. These measurements allow the buckles 110 and 112 to be placed in a location such that it does not interfere with a car's seatbelt mechanisms. In optional embodiments, different measures may be used to account for different applications.

Figure 2:
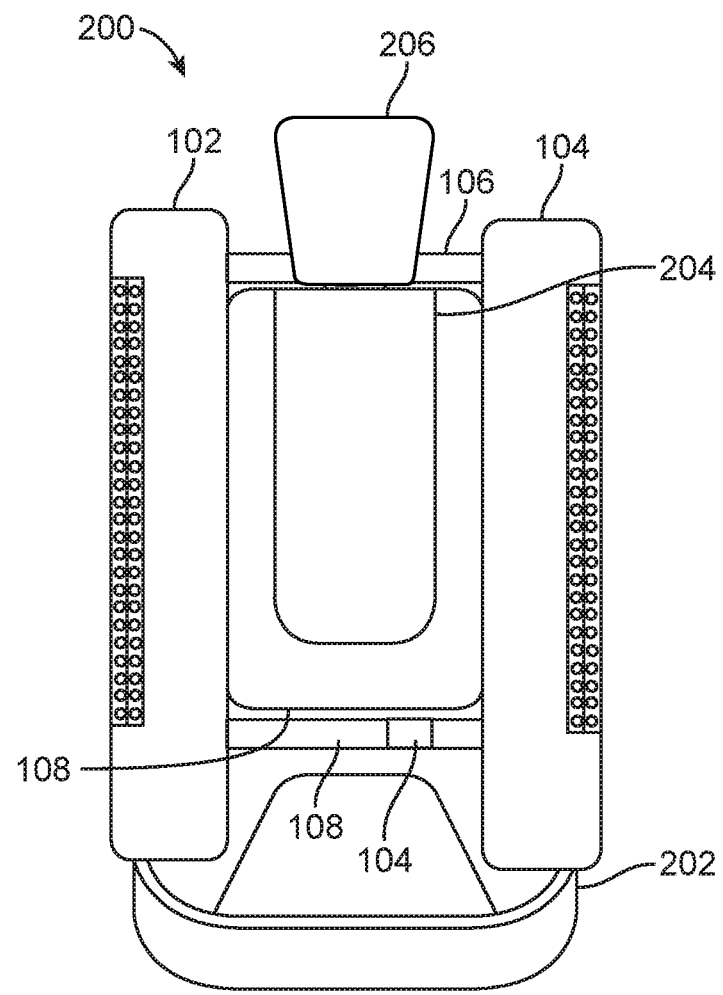
FIG. 2 is a perspective front view illustrating the support device positioned in a seat for use, in accordance with one embodiment of the present invention.

Referring now to FIG. 2, a perspective front view illustrating the support pillow positioned in a seat for use in accordance with one embodiment of the present invention, is presented generally at 200. In this illustration, the support pillow 100 is shown coupled to a seat chair. The first adjustable strap 106 is shown coupled around the headrest 206 of the chair. In optional embodiments, the first adjustable strap 106 may be coupled around the main body 204 of the chair to allow the headrest 206 to be free and usable for those individuals situated behind the user, such as for placement of a portable television screen on the headrest. The lower strap 108 is coupled around the main body 204 of the chair. When installed, the first elongated bolster 102 and second elongated bolster 104 sit on the base 202 on the chair. The second adjustable strap 108, when installed, sits on-top of the seatbelt included with the vehicle with the buckle 112 connecting over the seatbelt. The placement of the seatbelt when the support device 100 is installed in relation to the buckle 112 and second adjustable strap 108 is further discussed in relation to FIG. 3. In the current embodiment, the support pillow is shown placed directly on a seat. However, in optional embodiments, the support pillow may also be used in connection with a child booster seat.

Figure 3:
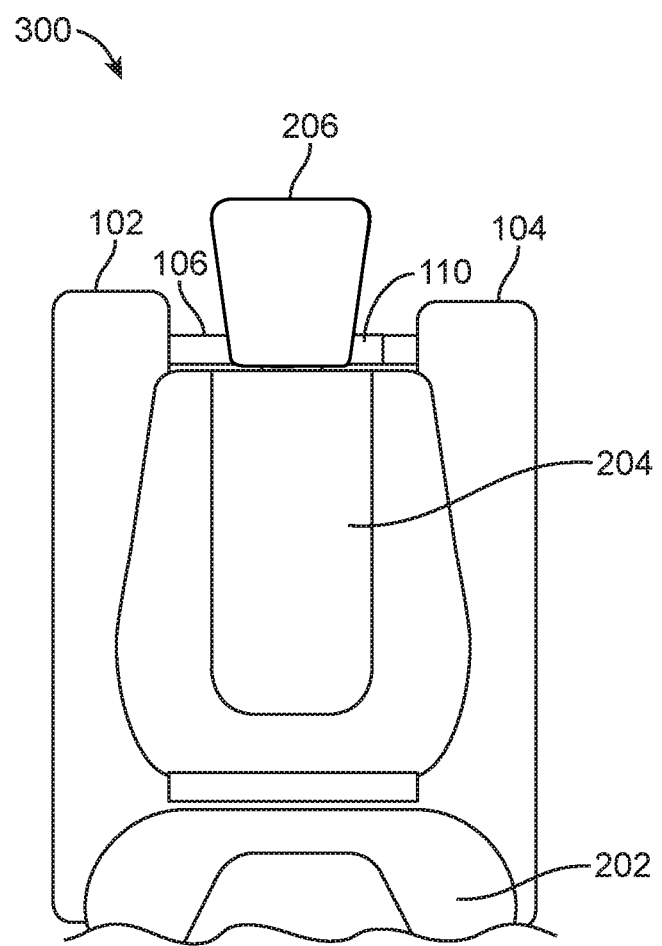
FIG. 3 is a perspective rear view illustrating the support device positioned in a seat for use, in accordance with one embodiment of the present invention.

Referring now to FIG. 3, a perspective rear view illustrating the support pillow positioned in a seat for use in accordance with one embodiment of the present invention, is presented generally at 300. The seat contemplated in this illustration is the back of the same seat shown in FIG. 200. In this embodiment, first adjustable strap 106 is shown coupled around the headrest 206. When the support pillow 100 is installed, the first elongated bolster 102 and second elongated bolster 104 extend outwardly past the exterior edge of the main body 204 and bottom 202. The buckle 110 is designed to couple behind the headrest 206 so as to not obstruct the seat belt or otherwise become a nuisance to a user while they try to sleep or rest.

Figure 4:
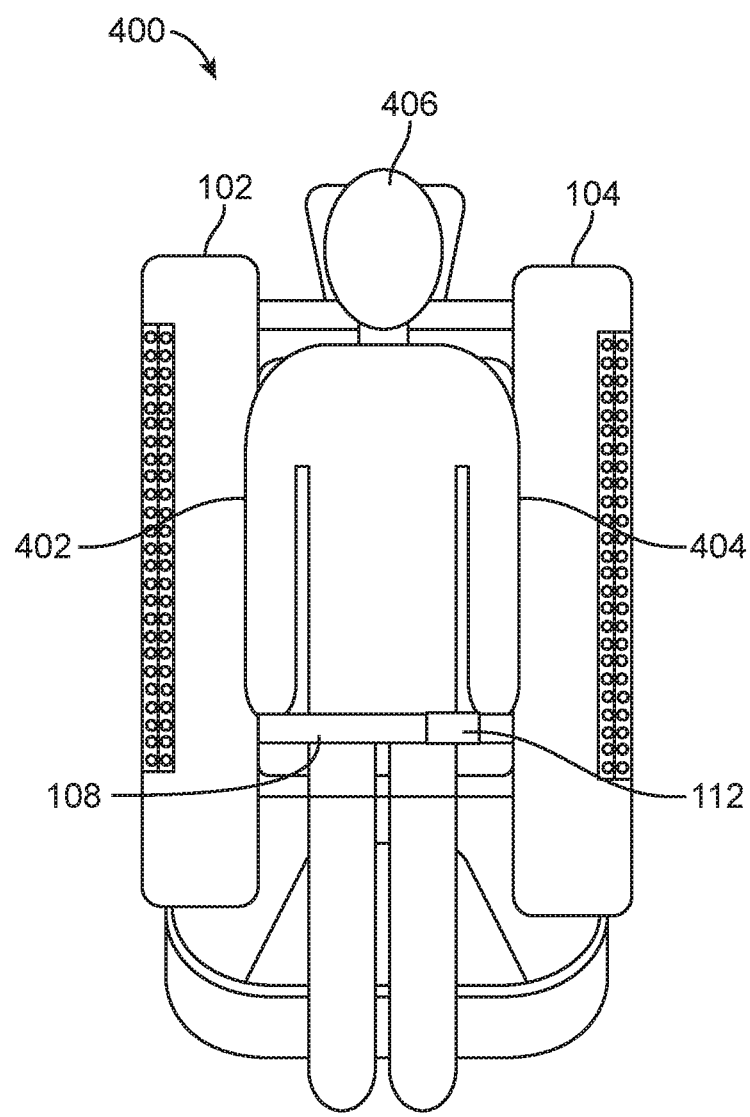
FIG. 4 is a perspective front view illustrating the support device in use in accordance with one embodiment of the present invention.

Referring now to FIG. 4, a perspective front view illustrating the support pillow in use in accordance with one embodiment of the present invention, is presented generally at 400. Here, a user 408 is shown seated in the chair with the support device 100 installed. Once installed, the left side of the user 402 will be held firmly against the first elongated bolster 102 and the right side of the user 404 will be held firmly against the second elongated bolster 104. When the support pillow 100 is installed, the user's head 406 will be supported by the first elongated bolster 102 and the second elongated bolster 104. This will allow a user to sleep or otherwise relax without suffering any discomfort or pain in the neck or shoulder area. When installed, the second adjustable strap 108 and the buckle 112 are configured to sit on-top of the seatbelts 410 that come pre-installed in the vehicle so that the full and safe operation of the pre-installed seat belts are not inhibited.

Figure 5:
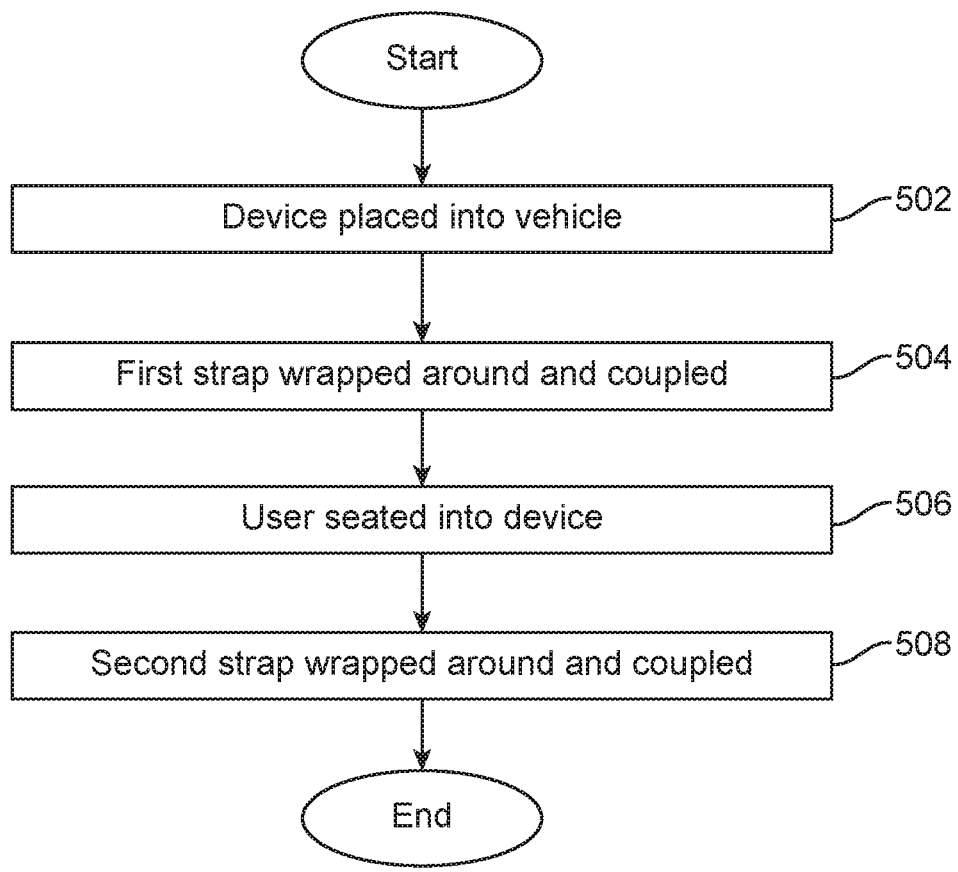
FIG. 5 is a method diagram illustrating how to use the support device in accordance with one embodiment of the present invention.

Referring now to FIG. 5, method diagram illustrating how to use the support pillow in accordance with one embodiment of the present invention, is presented generally at 500. The method begins by placing the support pillow into a vehicle 502. The support pillow is then coupled to a seat by placing the first adjustable strap 106 around the headrest 206 and coupling the left strap 144 to the right strap 146 through use of the buckle 110 and adjusting the first adjustable strap 106 such that the strap is taught against the headrest 504. Once the first adjustable strap 106 is secured to the headrest 206, the user is then seated into the seat that the support pillow is coupled to 506. Once the user is seated into the seat, the second adjustable strap 108 is coupled over the existing seatbelt, and the left strap 124 is coupled to the right strap 148 and the second adjustable strap 108 is adjusted so that it sits taught against the existing seatbelt 410 and the user 508.

Figure 6:
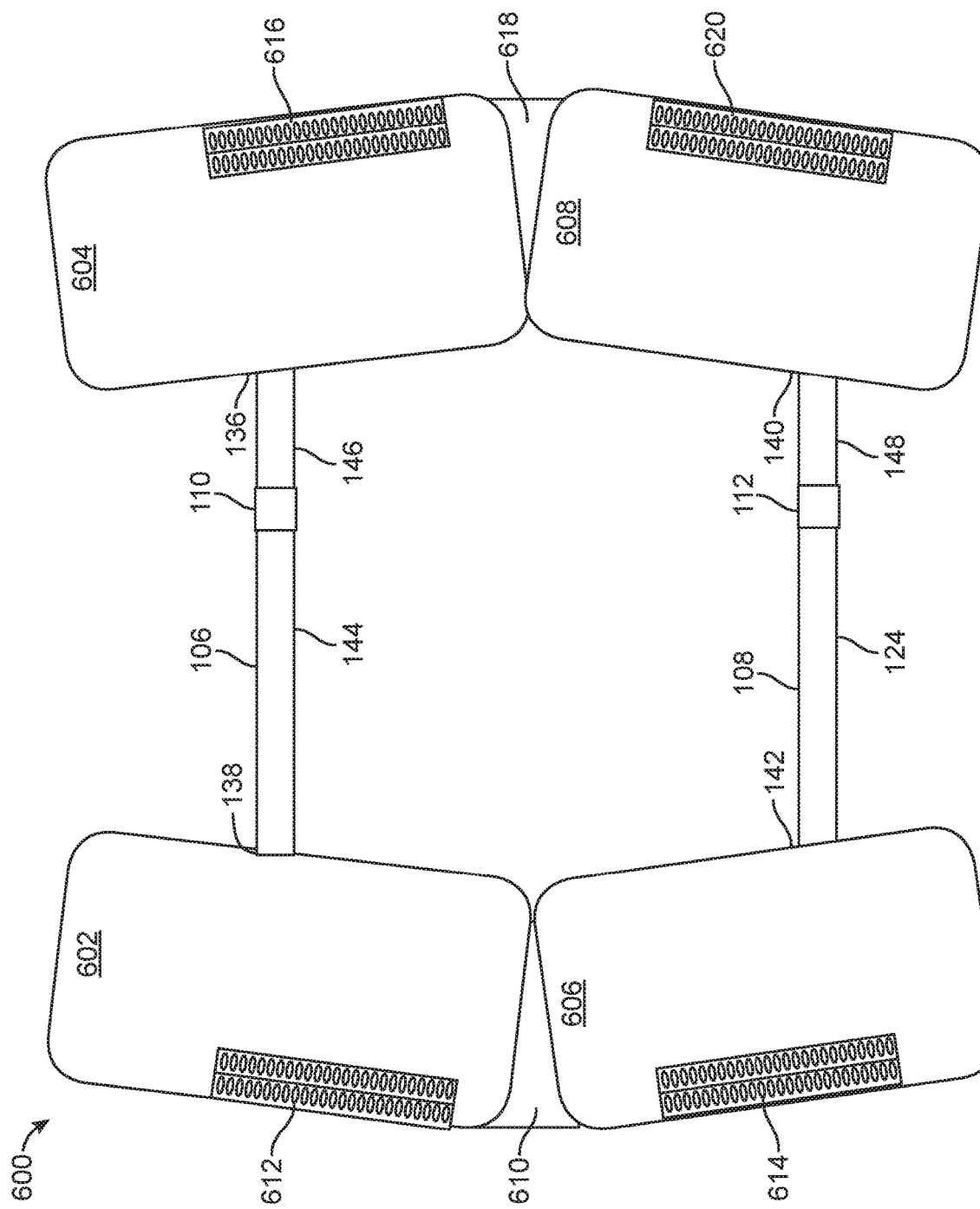
FIG. 6 is a perspective front view of an optional embodiment of a support device.

Referring now to FIG. 6, a perspective view of an optional embodiment of a support pillow is presented generally at 600. In this embodiment, the support pillow comprises four separate bolster cushions, 602, 604, 606, and 608. Each of the bolster cushions 602, 604, 606, and 608 each comprise a zipper 612, 616, 614, and 616, respectively. The left bolster cushions 602 and 606 are coupled together through the use of a flexible fabric joint 610, and the right bolster cushions 616 and 620 are coupled together through the use of a flexible fabric joint 618.

Still referring to FIG. 6, the optional support pillow presented in 600 comprises a first adjustable strap 106 coupled to the upper left bolster cushion 602 at the connection point 138 as well as to the upper right bolster cushion 604 at the connection point 138. The first adjustable strap 106 comprises a left strap 144 that is coupled to the upper left bolster cushion 602 as well as a right strap 146 that is coupled to the upper right bolster cushion 136. The left strap 144 is coupled to the right strap 146 to form one first adjustable strap 106 through the use of the buckle 110. In the current embodiment, the first adjustable strap 106 is coupled to the connection points 136, 138 through the use of stitching. In optional embodiments, the first adjustable strap 106 may be coupled to the connection points 136, 138 through the use of heat bonding or ultrasonic bonding.

Still referring to FIG. 6, the optional support pillow presented in 600 comprises a second adjustable strap 108 that is coupled to the lower left bolster cushion 606 at the connection point 142 and the lower right bolster cushion 608 at the connection point 140. The second adjustable strap 108 comprises a left strap 124 that is coupled to the lower left bolster cushion 606 as well as a right strap 148 that is coupled to the lower right bolster cushion 620. The left strap 124 is coupled to the right strap 148r to form one second adjustable strap 108 through the use of the buckle 112. In the current embodiment, the second adjustable strap 108 is coupled to the connection points 140, 142 through the use of stitching. In optional embodiments, the second adjustable strap 108 may be coupled to the connection points 140,142 through the use of heat bonding or ultrasonic bonding. In the current embodiment, the first adjustable strap 106 and the second adjustable strap 108 are comprised of nylon. In optional embodiments, the first adjustable strap 106 and the second adjustable strap 108 may be comprised of any other suitable material such as a polyester. In optional embodiments, releasable fasteners may be used.

Still referring to FIG. 6, in operation the flexible fabric joints 610 and 618 allow the bolsters 602, 604, 606, and 608 to be angled inwardly when the first adjustable strap 106 and the second adjustable strap 108 and coupled to the seat and pulled tightly. This embodiment creates additional support and may be used to help individuals who have certain disorders or are more susceptible to having a greater degree of tilt when resting their head. This optional embodiment also allows for use in smaller spaces.

While the present invention has been described in connection with what are presently considered to be the most practical and preferred embodiments, it is to be understood that the present invention is not limited to these herein disclosed embodiments. Rather, the present invention is intended to mobile phone the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including," "comprising," "having," and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

I claim:

1. A support device configured to overlay a seating assembly and further configured to support a user, the support device comprising:
    a first elongated bolster to support a first thoracic side of the user;
    a second elongated bolster to support a second thoracic side of the user;
    a first adjustable strap coupled to an upper portion of the first elongated bolster and an upper portion of the second elongated bolster such that the first adjustable strap connects each of the first and second elongated bolsters on the upper portion of the first elongated bolster and the upper portion of the second elongated bolster;
    a second adjustable strap coupled to a lower portion of the first elongated bolster and a lower portion of the second elongated bolster such that the second adjustable strap connects each of the first and second elongated bolsters on on the lower portion of the first elongated bolster and the lower portion of the second elongated bolster;
    wherein when the first adjustable strap is tightened the upper portions of the first and second elongated bolsters move together such that the first and second elongated bolsters form a tapered shape with respect to the other to support the user's thoracic sides, neck, head or any combination thereof;
    wherein each of the first and second elongated bolsters comprise a hollow interior and a closeable pouch to allow changing of a material in a hollow interior of each of the first and second elongated bolsters.

2. The support device of claim 1, wherein the first and second adjustable straps wrap around the seating assembly.

3. The support device of claim 1, wherein when the second adjustable strap is tightened, the lower portions of the first and second elongated bolsters move towards each other such that the first and second elongated bolsters form a parallel shape with respect to the other to support the thoracic sides of the user.

4. A method for supporting a user seated in a seating assembly, the method comprising:
    overlaying a support device on the seating assembly, the support device comprising a first elongated bolster to support a first thoracic side of the user and a second elongated bolster to support a second thoracic side of the user;

coupling the support device to the seating assembly by placing a first adjustable upper strap around the seating assembly;

adjusting the first adjustable upper strap so the first adjustable upper strap is taught against the seating assembly;

further coupling the support device to the seating assembly by placing a second lower adjustable strap around the seating assembly;

adjusting the first adjustable upper strap and second adjustable lower strap to support the user on the first thoracic side the second thoracic side.

5. The method of claim 4, wherein coupling the support device to the seating assembly comprises adjusting the first adjustable strap such that the first adjustable strap is taught against a back of the seating assembly.

6. The method of claim 4, wherein adjusting each of the first adjustable strap and second adjust able strap straps such that the user is supported on the first thoracic side the second thoracic side comprises tightening the first adjustable strap such that the first and second elongated bolsters move toward each other for a tapered shape with respect to the other to support the user's thoracic sides, neck and head of the user.

7. The method of claim 6, wherein adjusting each of the straps such that the user is supported on the second thoracic side, the second thoracic side comprises tightening the second adjustable strap such that the first and second elongated bolsters form a parallel shape with respect to the other to support the thoracic sides of the user.

8. The method of claim 4, wherein each of the first and second elongated bolsters comprise a hollow interior and a closeable pouch to allow changing of a material in the interior the of the bolsters.

* * * * *